US008813863B2

(12) United States Patent
Toublanc

(10) Patent No.: US 8,813,863 B2
(45) Date of Patent: Aug. 26, 2014

(54) SEMI-MOUNTED MONOWHEEL PLOUGH WITH ADJUSTABLE WORKING WIDTH BETWEEN PLOUGH BODIES

(75) Inventor: Sylvain Toublanc, Chateaubriant (FR)

(73) Assignee: Kuhn-Huard S.A., Chateaubriant (FR)

( * ) Notice: Subject to any disclaimer, the term of this patent is extended or adjusted under 35 U.S.C. 154(b) by 0 days.

(21) Appl. No.: 13/464,296

(22) Filed: May 4, 2012

(65) Prior Publication Data

US 2012/0292059 A1 Nov. 22, 2012

(30) Foreign Application Priority Data

May 19, 2011 (FR) ...................................... 11 54358

(51) Int. Cl.
*A01B 69/00* (2006.01)
(52) U.S. Cl.
USPC .......................................... 172/290; 172/477
(58) Field of Classification Search
USPC ......... 172/290, 255, 311, 477, 695, 656, 283; 56/377
See application file for complete search history.

(56) References Cited

U.S. PATENT DOCUMENTS

| | | | | | |
|---|---|---|---|---|---|
| 829,558 | A | * | 8/1906 | Weeks | 172/283 |
| 1,014,987 | A | * | 1/1912 | Weiler | 172/181 |
| 2,070,425 | A | * | 2/1937 | Engel | 172/297 |
| 2,982,081 | A | * | 5/1961 | Cooley | 56/377 |
| 3,176,457 | A | * | 4/1965 | Van Der Lely | 56/377 |
| 3,466,860 | A | * | 9/1969 | Van Der Lely et al. | 56/377 |
| 3,605,905 | A | * | 9/1971 | Bo | 172/260.5 |
| 3,817,333 | A | * | 6/1974 | Kinzenbaw | 172/283 |
| 4,036,305 | A | * | 7/1977 | Kinzenbaw | 172/283 |
| 4,036,306 | A | * | 7/1977 | Kinzenbaw | 172/287 |
| 4,049,063 | A | * | 9/1977 | Dietrich | 172/283 |
| 4,077,651 | A | * | 3/1978 | Steinbach et al. | 280/426 |
| 4,098,346 | A | * | 7/1978 | Stanfill et al. | 172/283 |
| 4,186,806 | A | * | 2/1980 | Ward | 172/283 |
| 4,301,872 | A | * | 11/1981 | Hastings et al. | 172/290 |
| 4,415,040 | A | * | 11/1983 | Salva | 172/225 |
| 4,592,429 | A | * | 6/1986 | Watts | 172/212 |
| 4,646,849 | A | * | 3/1987 | Watvedt | 172/225 |
| 4,778,013 | A | * | 10/1988 | Van der Lely | 172/225 |

(Continued)

FOREIGN PATENT DOCUMENTS

| | | | | | |
|---|---|---|---|---|---|
| DE | 2423142 | A | * | 12/1974 | A01B 3/46 |
| DE | 2919711 | A | * | 11/1980 | A01B 15/00 |

(Continued)

OTHER PUBLICATIONS

French Preliminary Search Report and Written Opinion issued Jan. 5, 2012, in French 1154358, filed May 19, 2011 (with English Translation of Categories of Cited Documents).

*Primary Examiner* — Árpád Fábián-Kovács
(74) *Attorney, Agent, or Firm* — Oblon, Spivak, McClelland, Maier & Neustadt, L.L.P.

(57) ABSTRACT

A semi-mounted monowheel plough includes a hitching device intended to be connected to a tractor, a single-piece frame equipped with plough bodies, a wheel and a beam guiding the wheel, the frame having a recess at the level of the wheel. Each plough body is connected to the frame by a first respective articulation, the plough bodies are connected with each other via a control mechanism integrated in the frame, each plough body is connected to the control mechanism by a second respective articulation and the control mechanism includes at least one straight bar and a curved bar.

10 Claims, 3 Drawing Sheets

(56) References Cited

U.S. PATENT DOCUMENTS

| | | | | |
|---|---|---|---|---|
| 4,932,197 | A | * | 6/1990 | Allen .............................. 56/377 |
| 5,267,618 | A | * | 12/1993 | Harrell .......................... 172/219 |
| 5,400,859 | A | * | 3/1995 | Harrell .......................... 172/219 |
| 5,598,691 | A | * | 2/1997 | Peeters .......................... 56/377 |
| 5,685,135 | A | * | 11/1997 | Menichetti ..................... 56/365 |
| 5,752,375 | A | * | 5/1998 | Tonutti .......................... 56/365 |
| 6,834,488 | B2 | * | 12/2004 | Menichetti ..................... 56/378 |
| 7,328,567 | B2 | * | 2/2008 | Kappel et al. ................... 56/378 |

FOREIGN PATENT DOCUMENTS

| | | | |
|---|---|---|---|
| DE | 3615298 | A1 | 11/1987 |
| DE | 199 50 523 | A1 | 4/2001 |
| DE | 100 39 600 | A1 | 2/2002 |
| EP | 0 046 905 | A1 | 3/1982 |
| EP | 0 358 537 | A2 | 3/1990 |
| FR | 2174985 | | 10/1973 |
| FR | 2 777 735 | | 10/1999 |
| RO | 125413 | A2 * | 5/2010 ............. A01B 23/04 |

* cited by examiner

SEMI-MOUNTED MONOWHEEL PLOUGH WITH ADJUSTABLE WORKING WIDTH BETWEEN PLOUGH BODIES

BACKGROUND OF THE INVENTION

1. Field of the Invention

The present invention relates to the general technical field of agricultural machinery and in particular to the field of ploughs. The invention relates to a semi-mounted monowheel plough comprising a hitching device intended to be connected to a tractor, a one-piece frame equipped with plough bodies, a wheel and a beam guiding the wheel, the frame having a recess at the level of the wheel.

2. Discussion of the Background

On a machine of this type, which is described in the patent EP 0 046 905, the frame of the plough is provided with several pairs of plough bodies and with one support wheel held by a beam. The wheel for support on the ground is a follower wheel which orientates itself automatically in the direction of advance taken by the tractor. The size and the diameter of the support wheel, carrying this known reversible semi-mounted plough, are limited by the height beneath the frame. As the number of plough bodies is conditioned by the maximum load supported by this wheel during transport, the size of the plough is limited. The frame has a recess at the level of the support wheel. The recess extends towards the soil which has already been ploughed. The recess allows the frame, and hence the plough bodies, to be brought closer to the support wheel.

The plough has at the front an offset adjustment device allowing the adjustment of the width of the first ploughed furrow. This adjustment consists in positioning the first plough body with respect to the wheels of the tractor. This adjustment is carried out by sliding to move the frame. As the plough bodies are rigidly fastened to the frame, their cutting width remains identical. On another hand, during transport, the rotation of the support wheel about its vertical axis must be locked so that the plough travels in total security. In addition, when working in sloping soils, the wheel cannot retain the plough, since it orientates itself with regard to the direction of advance. The wheel therefore drifts with the plough.

SUMMARY OF THE INVENTION

The present invention has the aim of overcoming the above-mentioned drawbacks. It should in particular propose a semi-mounted plough with an optimized working output according to the work conditions, and with reduced maintenance.

To this end, an important feature of the invention consists in that each plough body is connected to the frame by a first respective articulation, that the plough bodies are connected with each other via a control mechanism integrated to the frame, that each plough body is connected to the control mechanism by a second respective articulation and that the control mechanism comprises at least one straight rod and a curved rod. Owing to the articulations and to the adjustment mechanism, the working width of the plough bodies is rapidly adaptable for an optimum use of the plough bodies according to the work conditions and the traction power of the tractor. The high working output is guaranteed by the adapting of the working width according to the plot of land, its relief and the type of soil. Owing to the adjustment of the working width during work, the finishing of the plots of land is carried out as close as possible to the boundaries and the furrows passing around an obstacle can be straightened as and when required.

The use of an integrated control mechanism avoids a manual cleaning to remove the earth and the plant debris. The maintenance work is therefore reduced.

BRIEF DESCRIPTION OF THE DRAWINGS

Other features and advantages of the invention will emerge from the following description with respect to the attached drawings which are only given by way of non-restrictive examples of the invention. In these drawings.

DESCRIPTION OF THE PREFERRED EMBODIMENT

Figure 1:
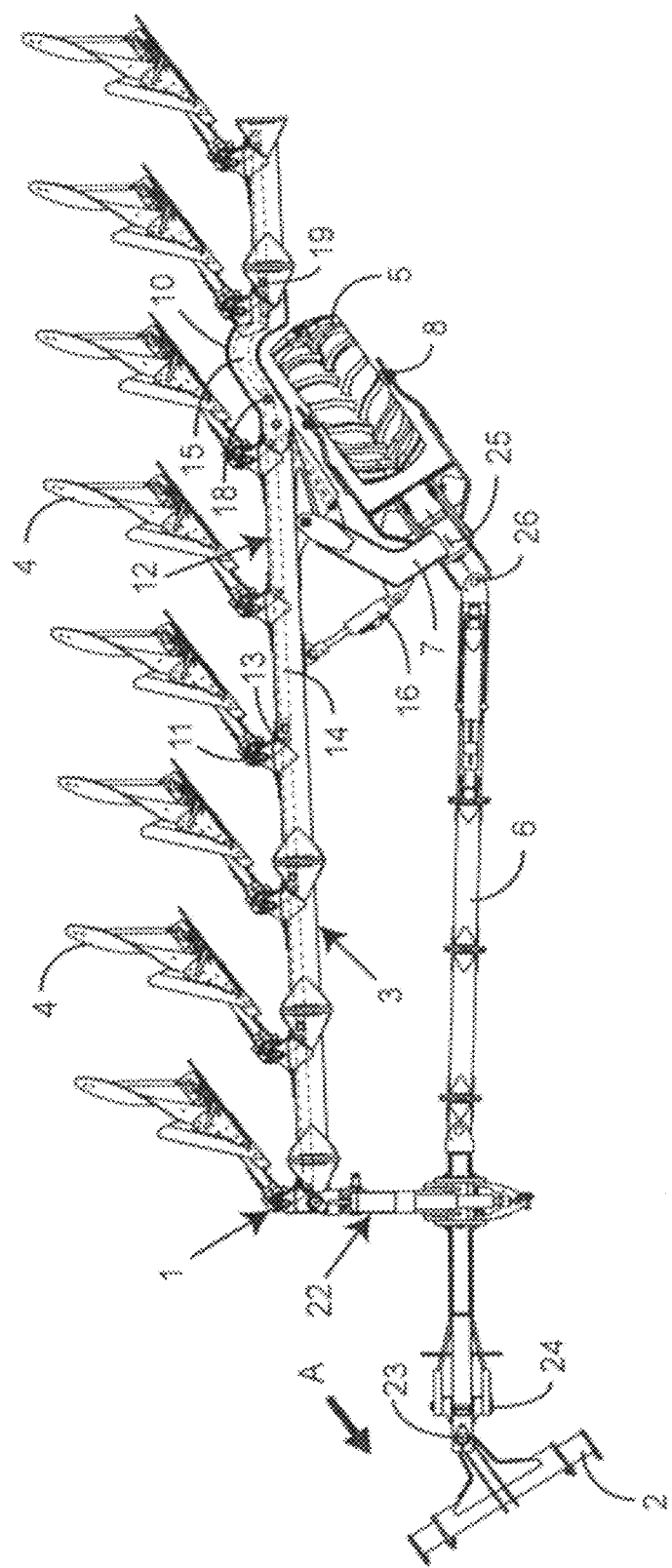
FIG. 1 represents a plough according to the present invention in a top view.

FIG. 1 represents a semi-mounted plough 1 according to the invention in a top view. The plough 1 is represented in a work position. The plough 1 comprises a hitching device 2 intended to be connected to a tractor (not represented), a frame 3 equipped with plough bodies 4, a wheel 5 and a beam 6 guiding the wheel 5. The beam 6 rests at the front on the hitching structure 2 and at the rear on a wheel arm 7. The plough 1 is connected in particular to the raising system of the tractor via lower arms and the upper bar. The tractor draws the plough 1 along a direction of advance indicated by the arrow A. In the rest of the description, the following concepts "front", "rear" and "in front", "behind" are defined with respect to the direction of advance A. When the tractor draws the plough 1, the plough bodies 4, which are working parts, cut, raise and turn over the strip of earth.

The plough which is represented rests on the ground by means of a single wheel 5, this is a monowheel plough. The support wheel 5 rolls over the ground by pivoting about a wheel axis 8 which is substantially horizontal and perpendicular to the direction of advance A. This wheel 5 has the function of controlling the depth of the plough bodies 4 during work and of removing the plough bodies 4 from earth to carry out the maneuvers at the end of the field. The wheel 5 also carries the plough 1 during transport. The support wheel 5 extends substantially at the rear of the frame 3 and laterally with respect to the frame 3. Its arrangement is such that generally the last plough body covers its passage. The wheel 5 is suited to move the frame 3 heightwise with respect to the ground by means of a jack. The single-acting jack is able to move the frame 3 between a low work position and a high maneuvering or transport position, and vice versa. The jack extends between the beam 6 and the wheel arm 7. In an alternative, the single-acting jack is replaced by a double-acting jack.

In accordance with FIG. 1, the plough bodies 4 are distributed over the entire length of the frame 3. The frame 3 is in a single piece, made of only one part. The frame 3 of the semi-mounted monowheel plough is rigid. The frame 3 has a recess 10 at the level of the wheel 5. The frame 3 is made overall by a straight beam and the recess 10 allows the two straight parts of the beam to be connected to pass around the wheel 5. Owing to the recess 10, the wheel 5 is kept close to the frame 3, which reduces the non-ploughed area, since it does not exceed the frame 3. The support wheel 5 keeps its orientation freedom owing to the recess 10. In the example embodiment which is represented, the recess 10 has an arc shape, the opening angle of which is comprised between 60° and 120°, the arc being a portion of a circle delimited by two points.

According to important features of the invention, each plough body 4 is connected to the frame 3 by a first respective articulation 11, the plough bodies 4 are connected with each other via a control mechanism 12 integrated in the frame 3, each plough body 4 is connected to the control mechanism 12 by a second respective articulation 13 and the control mechanism 12 comprises at least one straight rod 14 and a curved rod 15. Owing to the articulations 11, 13 and to the control mechanism 12, the working width of the plough 1 is adapted to all ploughing conditions. It is adapted according to the relief, the type of soil of the plot of land and the power of the tractor. The correction of the working width can also be carried out during work to take into account the change of state, for example the humidity and/or the variation in the composition of the plot of land. Given that the working width is adapted to the conditions, the working output is optimum. By being in the interior of the frame 3, the control mechanism 12 is protected from external aggressions such as shocks. The earth and the debris cannot accumulate on the rods 14, 15. In addition, the arrangement inside the frame 3 allows a simple control mechanism 12 with a reduced number of components to be used.

According to another advantage of the adjustment of the working width during work, the plots of land are finished as close as possible to the boundaries, and the ploughed furrows can be straightened after the plough has passed around an obstacle.

According to the invention, all the plough bodies 4 are connected with each other by a control mechanism 12 such that their cutting width is increased or reduced simultaneously. The orientation or the cutting width of the plough bodies 4 is managed by an actuator 16. The actuator 16 extends between the frame 3 and the wheel arm 7. This actuator 16 is a double-acting hydraulic jack. Each of the plough bodies 4 is articulated on the frame 3 via a first respective articulation 11, having a longitudinal axis which is at least substantially vertical when the plough 1 is in a work configuration. By pivoting about the first articulation 11, the plough body 4 can move towards or away from the frame 3 and can therefore work a strip of earth of different width. For a centralized adjustment of the working width for all the plough bodies 4, each is connected to the control mechanism 12 via a second respective articulation 13 having a longitudinal axis which is at least substantially vertical when the plough 1 is in a work configuration.

In order that the plough 1 operates under good conditions, the wheel 5 must always be parallel to the plough bodies 4 which are parallel to the direction of advance A. The wheel 5 is thus also connected to the control mechanism 12 via a wheel bar 17. The control mechanism 12 therefore serves to adjust the width of the furrows and the tractor/plough traction axis. The wheel bar 17 is connected to the wheel arm 7. In that way, when the working width is modified, the orientation of the wheel 5 is corrected consequently. The wheel 5 allows the plough 1 to keep the plough bodies 4 parallel to the direction of advance A. The recess 10 allows the frame 3 to pass around the rear part of the wheel 5 and to set the extreme position towards the rear and laterally in the ploughing direction of this wheel 5.

In the example embodiment represented in FIG. 1, the plough 1 is equipped with eight plough bodies 4. It can therefore work a large width of ground in one passage. The wheel 5 maneuvers on the non-ploughed soil which is still provided with vegetation. The trace of the wheel 5 will be obliterated by the work of the last two plough bodies. It is to be noted that one of the plough bodies is connected to the recess 10 and that the orientation of the wheel axis 8 is substantially identical to the orientation of the tractor. It is to be noted that the frame 3 is made from several parts assembled by bolts. The frame 3 is made of a hollow beam which is suited to receive the control mechanism 12. The control mechanism 12 of the plough bodies 4 is substantially parallel to the frame 3. The frame 3 is composed of two front extensions, a central part having the recess 10 and a rear extension. The cut out of the control mechanism 12 corresponds substantially to the cut out of the frame 3 for assembly reasons. Straight bars correspond to the front and rear extensions. The central part of the frame 3 has a straight bar 14 and a curved bar 15. All the bars composing the control mechanism 12 are connected so that the adjustment of the working width is centralized.

Figure 2:
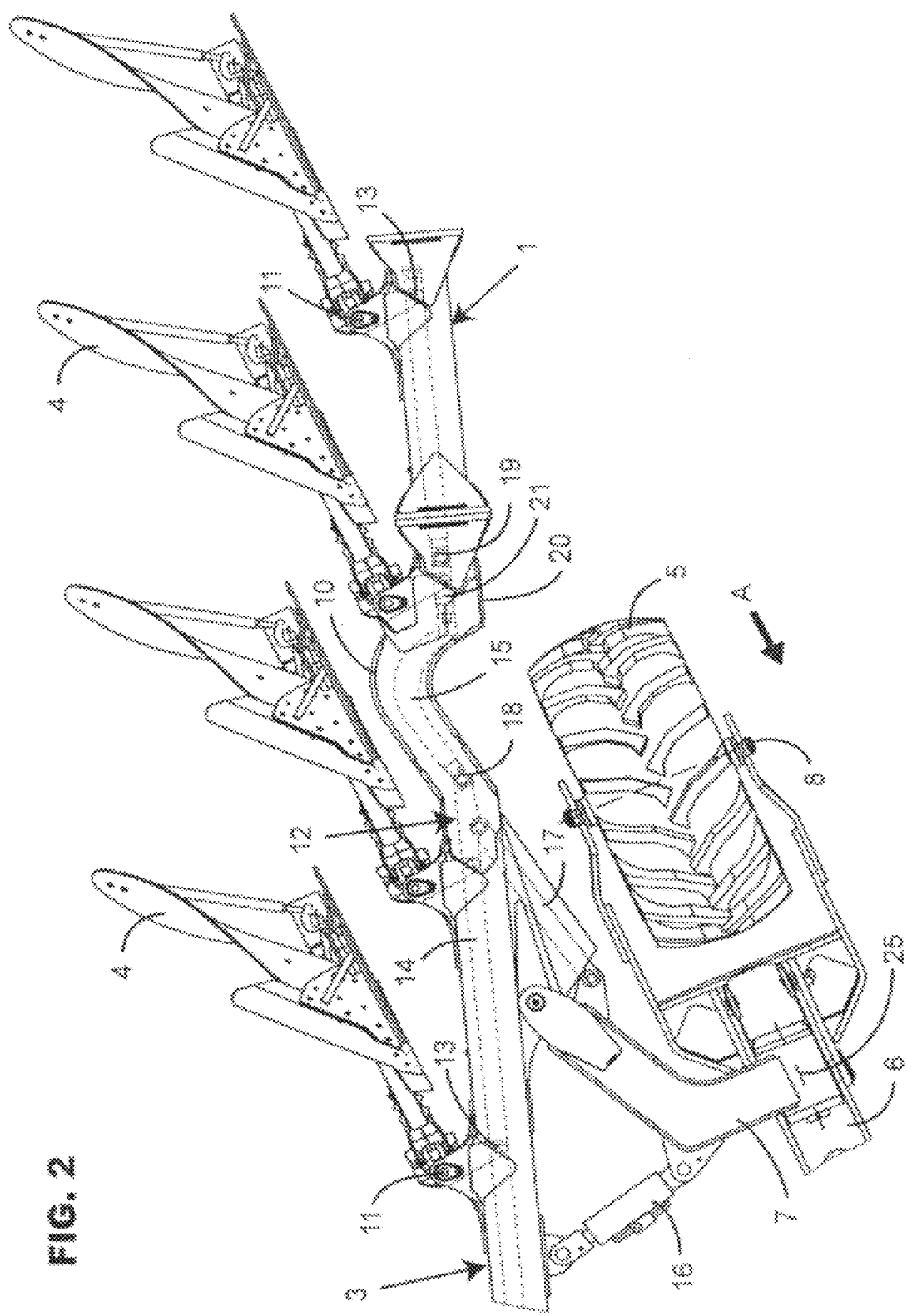
FIG. 2 is a top view and on a larger scale of a part of the plough.

FIG. 2 represents, in greater detail, the environment around the wheel 5 and the recess 10. The plough 1 is situated in the same position as in FIG. 1. According to this figure, the transverse section of the recess 10 is substantially identical to the transverse section of the frame 3. The curved bar 15 has a shape corresponding to the recess 10 so that the latter can be integrated in the frame 3. The curved bar 15 has a shape which bends in a circular arc with an opening angle comprised between 60° and 120°. It has a banana shape. The curved bar 15 extends between the straight bar 14 of the central part and the straight bar of the rear extension. Thus, the curved bar 15 is connected to the straight bar 14 by a front articulation 18 and to the bar of the rear extension by a rear articulation 19. The front and rear articulations 18, 19 have an axis which is substantially vertical during work. The straight bars 14 bear traction and compression stresses, whilst the curved bar 15 is dimensioned to bear bending stresses. For the assembly of the control mechanism 12, the straight bars are inserted by one of the ends in the extensions or in the central part of the frame 3, with the frame 3 having holes in the vicinity of the second articulations 13 to connect the bars.

Figure 3:
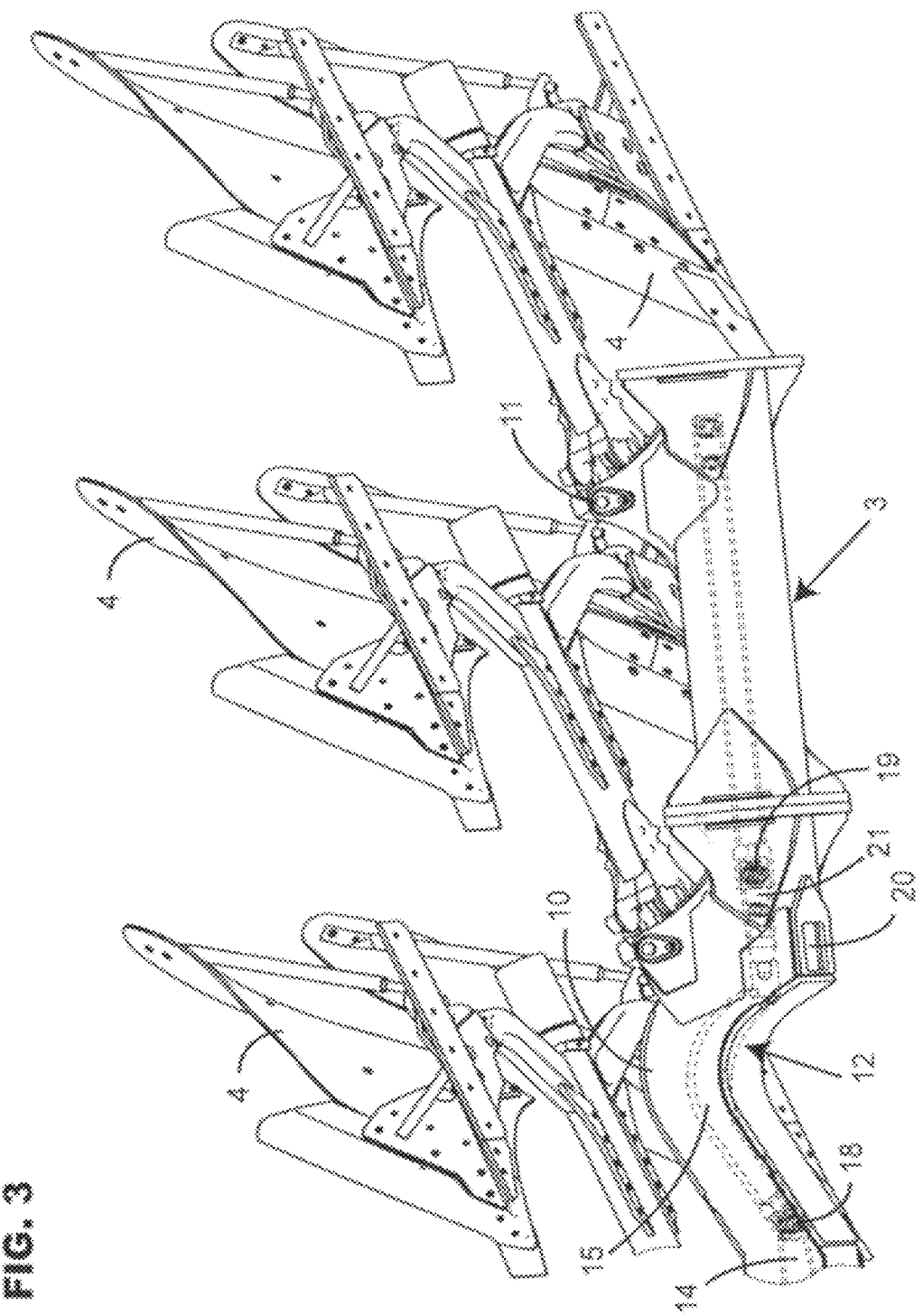
FIG. 3 is a perspective view on a larger scale of the plough in a work position.

According to FIG. 3, the assembly of the curved bar 15 is carried out, for its part, by an opening 20 specially arranged within the frame 3. This opening 20 extends at the level of the recess 10. The opening 20 is arranged on the lateral face of the frame 3, facing the wheel 5, which frame extends in the work position. The size of the opening 20 is such that the resistance of the frame 3 is not reduced. The opening 20 is closed off to prevent the introduction of earth in the frame 3. This opening 20 of reduced size allows the introduction of the curved bar 15. It is to be noted that the connection of the curved bar 15 to the bar of the rear extension requires the insertion of a small bar 21. This small bar 21 is inserted by the rear of the central part of the frame 3 and it is screwed in the curved bar 15.

According to an example embodiment which is not shown, the opening is arranged in the frame 3 according to a substantially horizontal plane, the frame 3 extending in the work position. According to another example embodiment which is not shown, the opening is arranged in the frame 3 according to a substantially vertical plane, the frame 3 extending in the work position. In these two cases, the opening being much more sizeable, the small bar and the curved bar are made in a single piece.

In another example embodiment, when there is no rear extension, the curved bar 15 is solely connected to the straight bar 14. The link is made by a front articulation.

With regard to FIG. 3, the plough bodies 4 are distributed according to two groups, each being active in a respective work position. It is stated that the plough 1 is reversible. Thus, the plough 1 comprises a turn-over device 22 allowing the frame 3 to be connected to the beam 6. Under the action of the turn-over device 22, the frame 3 is able to pivot with respect to a longitudinal axis embodied by the beam 6 to pass from one work position to another. Thus, the right-hand and left-hand plough bodies are put successively into service by rotation of the frame 3 by a half-turn corresponding to 180°. The beam 6 is arranged between the hitching device 2 and the frame 3. The beam 6 is connected at the front via a vertical axis 23 followed by a transverse axis 24 which is substantially horizontal on the hitching device 2. The vertical axis 23 allows a better following of the tractor in particular in turn-rows, and the transverse axis 24 allows a displacement of the frame 3 so as to better follow the relief of the terrain. At the level of the wheel 5, the frame 3 pivots about a horizontal axis 25 directed substantially parallel to the direction of advance A. The beam 6 is connected via a vertical articulation 26 to the support wheel 5. The turn-over device 22 is advantageously constituted by two single-acting or double-acting hydraulic jacks. To position the plough in its transport position, the turn-over device 22 pivots by a quarter turn corresponding to 90° from one of the work positions. During transport, the axes of the first articulations 11 of the plough bodies 4 extend substantially horizontally and perpendicularly to the direction of advance A. Given that the frame 3 is brought closer to the wheel 5 owing to the recess 10, the imbalance, i.e. the resistant torque on turning around, is reduced.

It is readily evident that the invention is not limited to the embodiment described above and represented in the attached drawings. Modifications remain possible, in particular with regard to the constitution or the number of the various elements or by substitution of technical equivalents without, however, departing from the scope of protection as defined by the following claims.

What is claimed as new and desired to be secured by Letters Patent of the United States is:

1. A semi-mounted monowheel plough comprising a hitching device to be connected to a tractor, a single-piece frame equipped with plough bodies, a wheel and a beam guiding the wheel, the beam having a first end adjacent to the hitching device and a second end adjacent to the wheel, the frame having a recess at the level of the wheel,
wherein a first respective articulation pivotably connects each plough body to the frame such that each plough body pivots individually toward and away from the frame about the first respective articulation,
wherein the plough bodies are connected with each other via a control mechanism integrated in the frame,
wherein each plough body is connected to the control mechanism by a second respective articulation,
wherein the control mechanism comprises at least one straight bar and a curved bar, and the curved bar is the recess of the frame at the level of the wheel, and
wherein the wheel is connected to the control mechanism via a wheel bar at the second end of the beam.

2. A plough according to claim 1,
wherein the curved bar is a circular arc with an opening angle comprised between 60° and 120°.

3. A plough according to claim 1,
wherein the curved bar is connected to one of the straight bars by a front articulation having a substantially vertical axis.

4. A plough according to claim 1,
wherein the transverse section of the recess is substantially identical to the transverse section of the frame.

5. A plough according to claim 1,
wherein the control mechanism further comprises an actuator.

6. A plough according to claim 1,
wherein the frame has an opening at the level of the recess.

7. A plough according to claim 6,
wherein the opening is on the lateral face of the frame opposite to the wheel, with the frame extending in a work position.

8. A plough according to claim 6,
wherein the opening is in a substantially horizontal plane, with the frame extending in a work position.

9. A plough according to claim 6,
wherein the opening is in a substantially vertical plane, with the frame extending in a work position.

10. A plough according to claim 1, wherein the wheel is closest to the frame at a location of the curved bar.

* * * * *